United States Patent

Qutub

[11] Patent Number: 5,873,429
[45] Date of Patent: Feb. 23, 1999

[54] SUPPORT FOR EXHAUST SYSTEM

[75] Inventor: Ibrahim Qutub, Beaverton, Oreg.

[73] Assignee: Freightliner Corporation, Portland, Oreg.

[21] Appl. No.: 735,965

[22] Filed: Oct. 23, 1996

[51] Int. Cl.⁶ .................................................. B60K 13/04
[52] U.S. Cl. ............................ 180/309; 180/296; 248/59
[58] Field of Search .................................. 248/58, 59, 60, 248/65, 74.1, 284.1; 60/322, 687; 180/309, 296, 89.2

[56] References Cited

U.S. PATENT DOCUMENTS

| | | | |
|---|---|---|---|
| 4,273,477 | 6/1981 | Murphy | 406/39 |
| 4,654,612 | 3/1987 | Smith | 248/59 X |
| 5,649,685 | 7/1997 | Keller | 248/638 |

OTHER PUBLICATIONS

Photographs of Kenworth Muffler Mount for Large trucks, showing a mounting bracket on the cab of a truck, connected by a flexible sheet of material to a pair of muffler clamps at the top end of a muffler; and showing a metal bracket fastened to a truck chassis frame, with muffler clamps fastening and exhaust pipe to the bracket where the exhaust pipe extends horizontally from the engine toward an elbow beneath the vertically-extending muffler. Known prior to the present invention.

*Primary Examiner*—Robert J. Oberleitner
*Assistant Examiner*—Avraham H. Lerner
*Attorney, Agent, or Firm*—Chernoff, Vilhauer, McClung & Stenzel LLP

[57] ABSTRACT

A support arrangement for an exhaust system including an upright muffler and an upwardly-extending exhaust stack located behind the cab of a truck. An arm is mounted on a frame member of the truck, and a vibration isolator supported on the arm in turn supports the weight of an exhaust pipe elbow, a muffler, and a stack located above the muffler, all oriented generally upwardly. A pair of links are attached to the exhaust stack and to a mounting fastened to the back side of the cab to support the muffler and stack with respect to longitudinal and lateral movement relative to the truck while still permitting vertical movement of the cab relative to the frame.

12 Claims, 5 Drawing Sheets

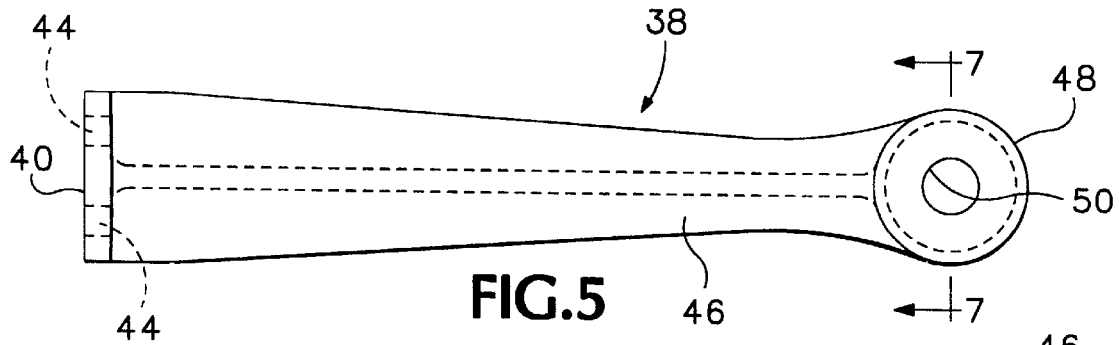
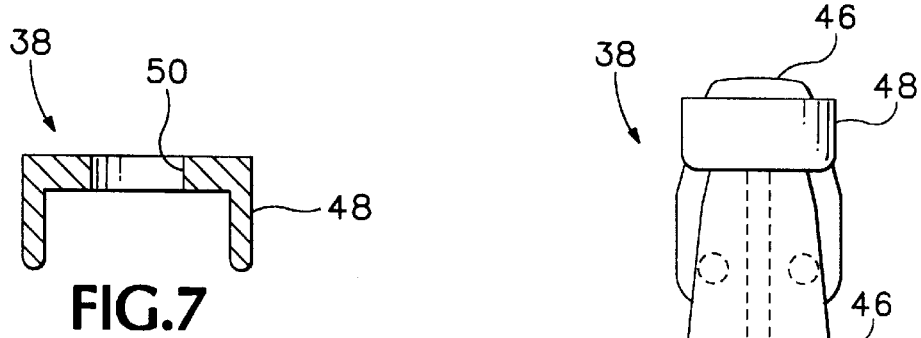
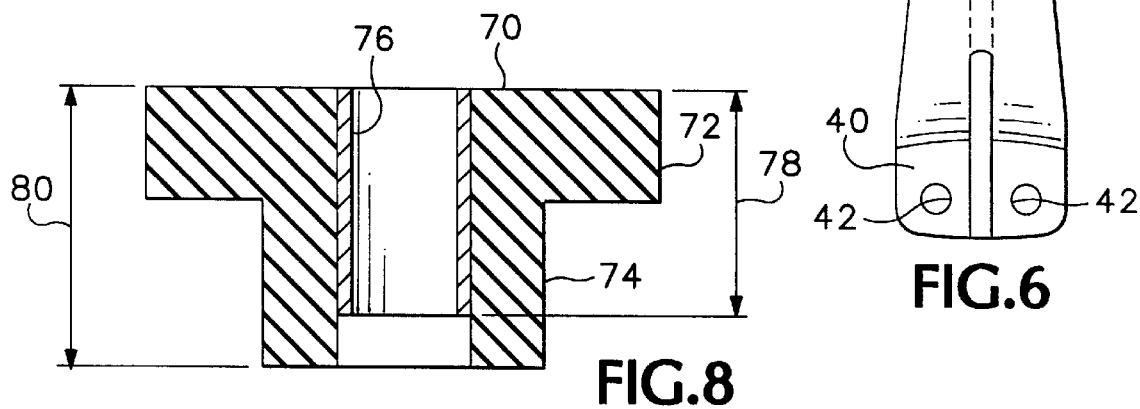
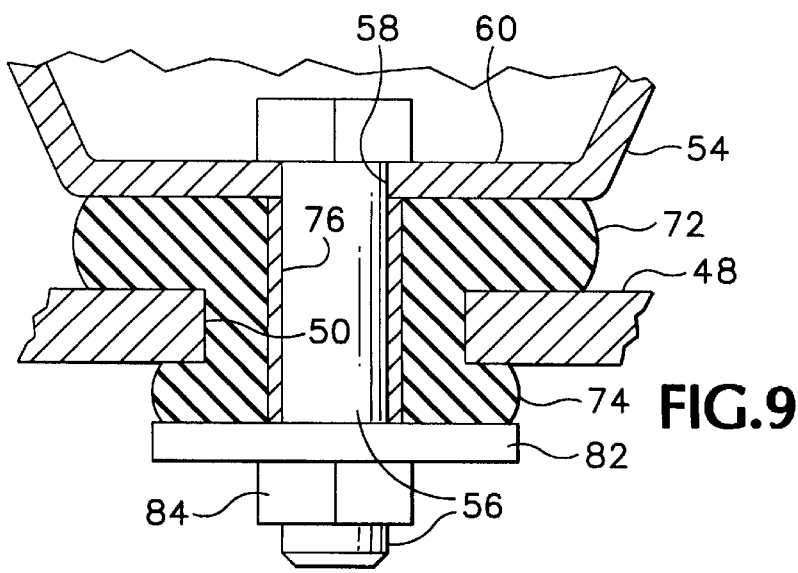

SUPPORT FOR EXHAUST SYSTEM

BACKGROUND OF THE INVENTION

The present invention relates to trucks, and in particular relates to provision of mechanical support for portions of an engine exhaust outlet system for a heavy-duty truck.

It is common to place a muffler in an exhaust system for a heavy-duty semi-trailer truck in a vertical orientation, with an exhaust outlet pipe, or stack, extending further upward above the top of such a muffler to emit exhaust gases from the engine of such a large truck at some distance above the cab of the truck, so that exhaust gases will be dissipated quickly without being drawn into the cab. Locating such vertically-oriented mufflers behind the cab of such a large truck is desirable for various reasons which do not relate to the present invention. However, in the past, the mechanical supports for the exhaust system of such large trucks, and in particular for the mufflers and upwardly-extending exhaust stacks of such trucks have usually included support framework mounted on the frame of the truck. Such support framework has included diagonal cross bracing to hold a muffler and stack securely, with no interconnection between the muffler or stack and the cab of such a large truck, at least partly because the cab of a large truck is usually supported on the frame through resilient mounting devices, to isolate the cab and its occupants from at least a part of the vibration experienced by the chassis of the truck. Such exhaust system support arrangements in the past have been somewhat expensive and have added undesirable weight to the trucks on which they are used.

What is desired, then, is a support system, for a portion of an exhaust system including a vertically oriented muffler, which is of simpler construction than has previously been known, yet which provides ample support for such muffler without interfering with the isolation of the cab from the frame of such a truck.

SUMMARY OF THE INVENTION

The present invention provides a support arrangement for a portion of an exhaust outlet system for a motor vehicle such as a heavy-duty truck which is relatively simple yet provides ample support for the portions of an engine exhaust system including an upright muffler and stack of such a truck.

In accordance with the present invention, a lower end of an upright muffler and exhaust stack, together with an exhaust pipe elbow located beneath the muffler, are supported upon a lower exhaust system support assembly attached to a frame member of a motor vehicle such as a heavy truck. The lower support assembly includes an arm, or bracket, extending generally laterally away from the frame member and having an outer end provided with a resilient vibration isolating attachment device which both supports and attaches the exhaust pipe elbow, so that the muffler and exhaust stack extend substantially directly upward above the outer end of the support arm, and so that the frame of the vehicle supports substantially the entire weight of the exhaust pipe elbow, muffler, and stack. A stabilizing upper support assembly interconnects the exhaust stack or outlet end of the muffler with the back side of a cab of the vehicle, supporting the upper portion of the exhaust system in the longitudinal and lateral directions with respect to the frame of the motor vehicle.

In a preferred embodiment of the invention, the upper support assembly includes a pair of trunnions attached to an upper end of the muffler or with the exhaust stack above the muffler, and a mounting attached to the back side of the cab. A pair of links interconnect the trunnions with the mounting to establish and maintain a distance between the stack and the back side of the cab. Preferably, the links are attached pivotally to front and rear horizontal pivot axes defined by the mounting and by the trunnions, to accommodate upward or downward movement of the cab with respect to the frame resulting from isolation of the cab from the frame by elastic or shock-absorbing mounting devices.

In one embodiment of the invention, the lower support assembly includes a cast aluminum bracket or arm bolted to a vertical side of a longitudinal frame member of the vehicle, and an attachment bracket welded to an exhaust pipe elbow is attached to and supported atop an elastomeric vibration isolator supported on the outer end of the cast aluminum bracket.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWING

FIG. 5 is a top plan view of the lower support member shown in FIG. 4.

FIG. 6 is an outer end view of the lower support member shown in FIGS. 4 and 5.

FIG. 7 is a section view taken along line 7—7 of FIG. 5.

FIG. 8 is a sectional view of an elastomeric vibration isolator mounting, shown apart from the lower support arm.

FIG. 9 is a sectional view of the vibration isolator shown in FIG. 8, in use attaching the exhaust pipe elbow shown in FIG. 4 to the outer end of the lower support arm.

DETAILED DESCRIPTION OF THE PREFERRED EMBODIMENT

Figure 1:
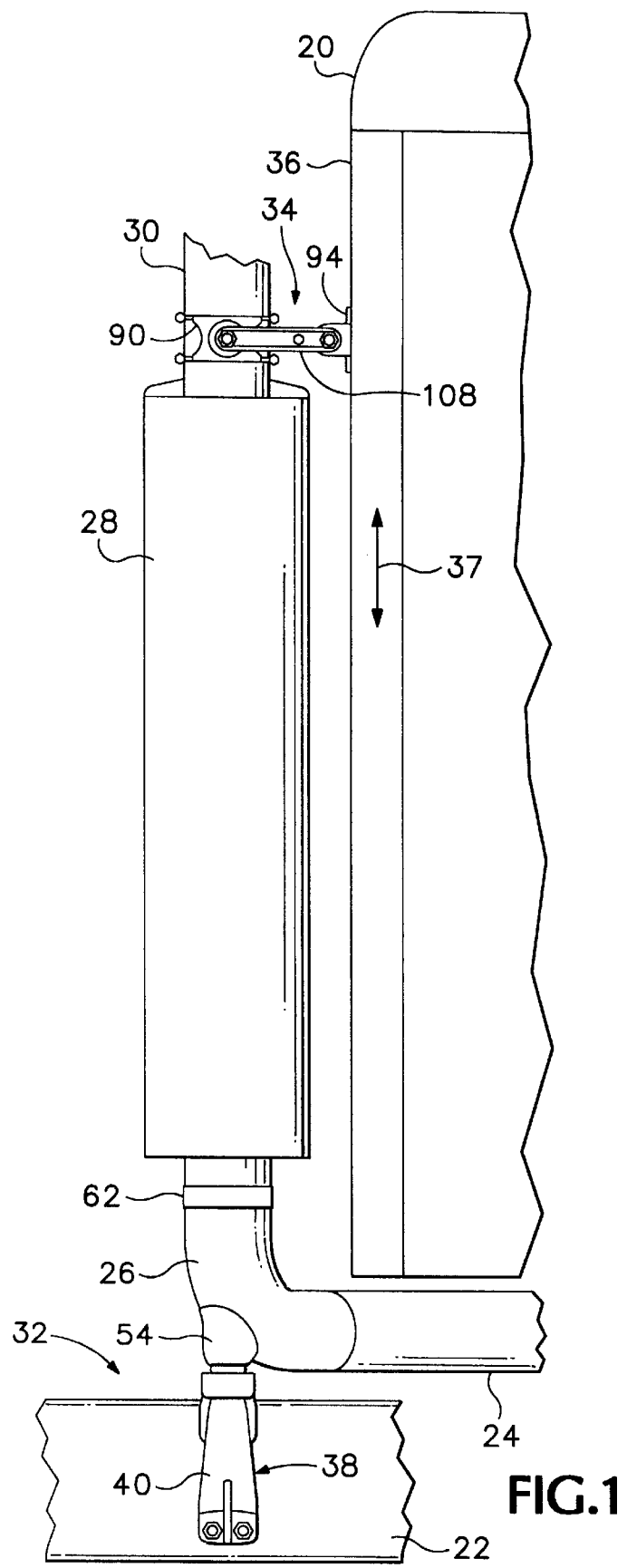
FIG. 1 is a side elevational view of a portion of a cab of a heavy-duty truck, showing a portion of an exhaust system supported according to the present invention.
Figure 2:
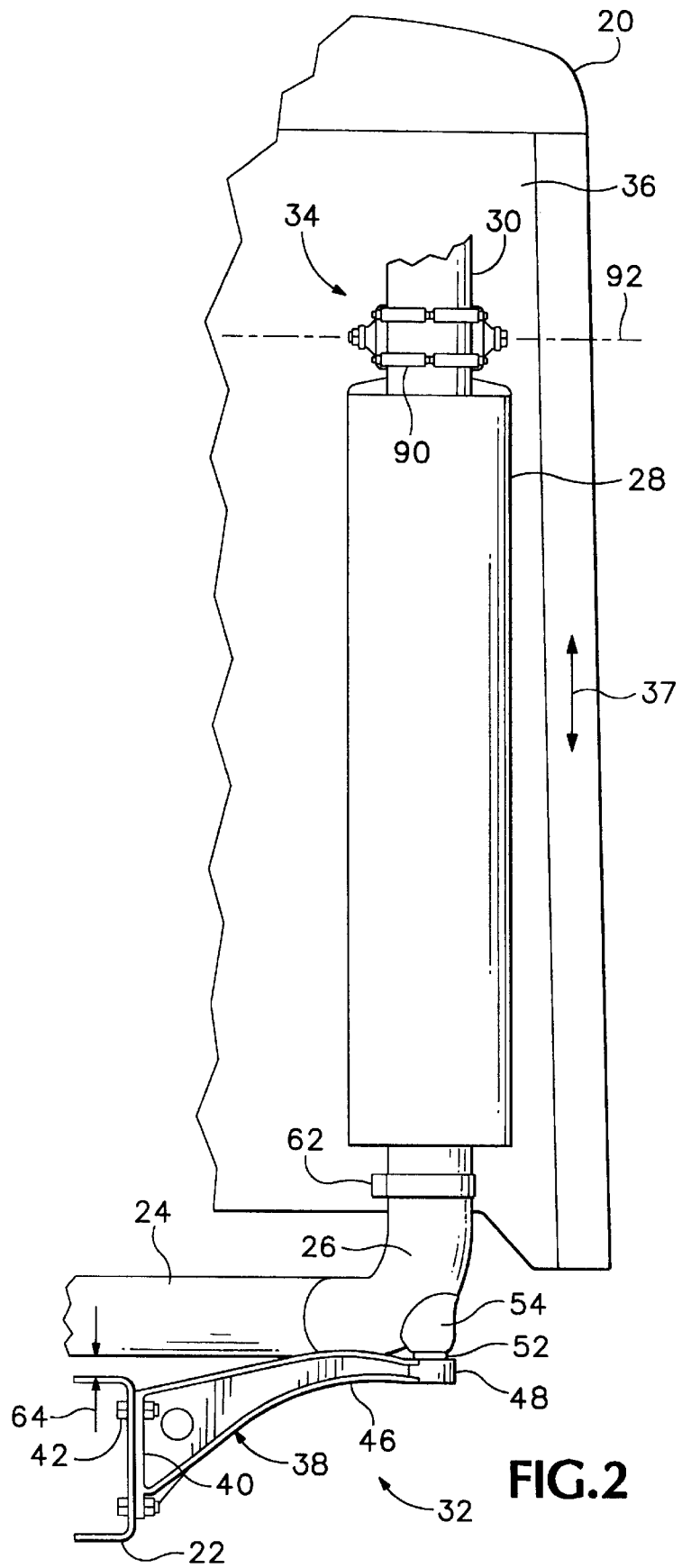
FIG. 2 is a rear elevational view of the portion of a truck and portion of an exhaust system shown in FIG. 1.
Figure 3:
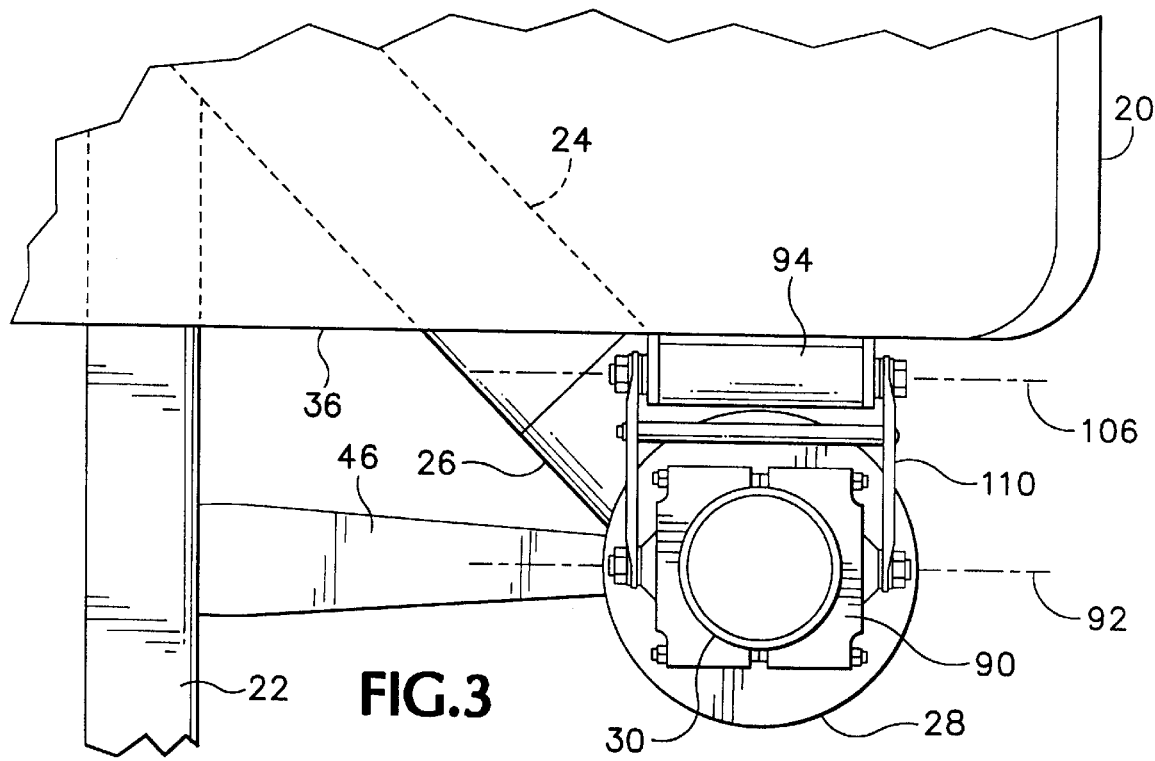
FIG. 3 is a top plan view of the portion of a heavy-duty truck and portion of an exhaust system shown in FIGS. 1 and 2.
Figure 4:
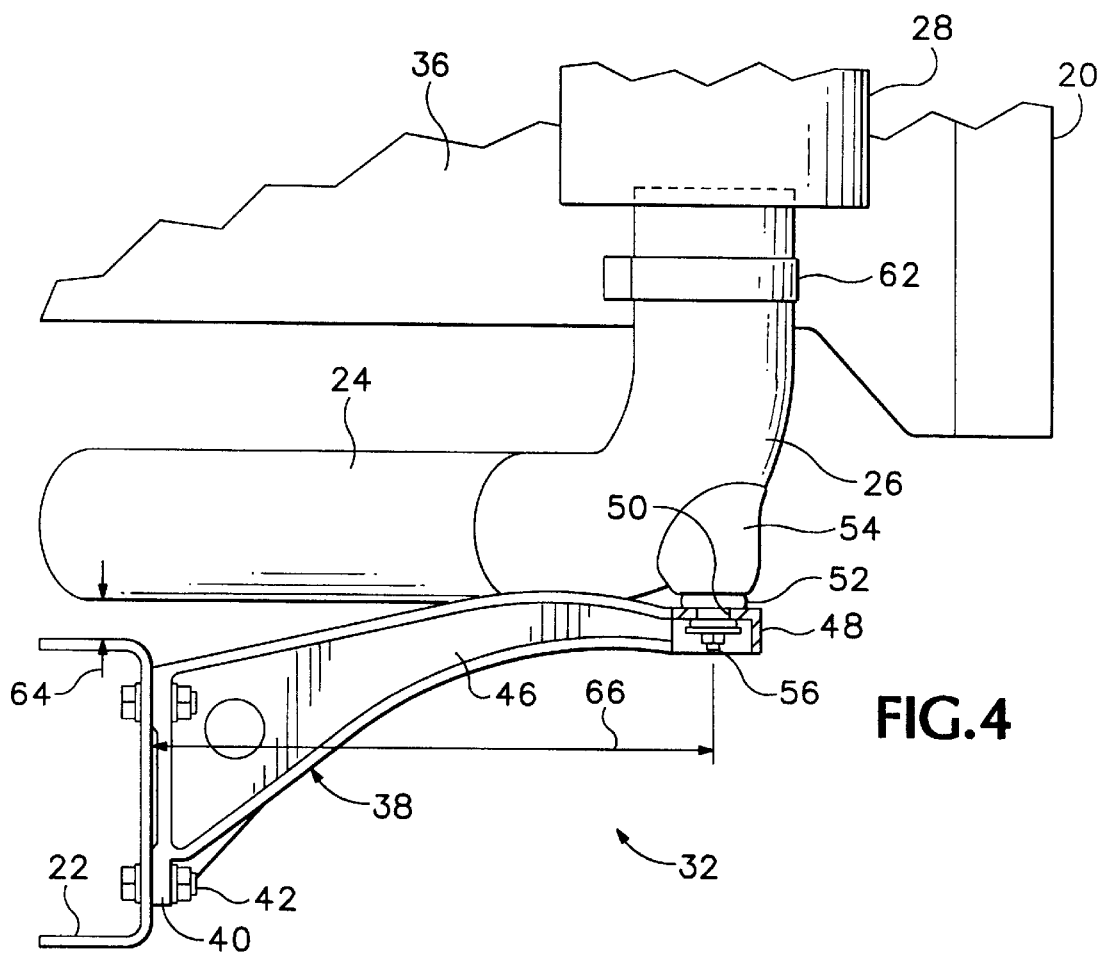
FIG. 4 is a rear elevational view of a lower support assembly for an exhaust system as shown in FIG. 2, at an enlarged scale.

Referring now to the drawings which form a part of the disclosure herein, and in particular referring to FIGS. 1, 2, 3, and 4, a portion of a resiliently mounted cab 20 of a motor vehicle such as a heavy-duty semi-trailer truck is shown located above a longitudinal frame member 22 of the truck. An engine exhaust pipe 24 extends rearwardly above the frame member 22 to an exhaust pipe elbow 26, above which is located a vertically oriented generally cylindrical muffler 28. An exhaust stack 30, which is a tubular outlet conduit for further movement of exhaust gases exiting from the muffler 28, is attached to the upper end of the muffler 28 and extends upwardly above it to an open end (not shown) from which the exhaust gases eventually are permitted to escape. While the right side of the truck is shown, a similar arrangement could be provided on the left side as well.

The exhaust pipe elbow 26, muffler, 28, and stack 30 are held in a generally vertical orientation and located behind the cab 20, by an exhaust system support arrangement according to the present invention including a lower support assembly 32 attached to the frame 22 of the truck and an upper support assembly 34 attached to a back side 36 of the cab 20.

Typically, the cab 20 is supported above the frame 22 by a vibration isolation mounting, which may include either rubber or other elastomeric components or gas-filled shock absorbers, allowing the cab 20 to move generally vertically a small distance with respect to the frame 22 as indicated by the arrow 37, so that the cab 20 and its occupants do not feel all of the vibration experienced by the frame 22. The relative movement between the cab 20 and the frame 22 in the direction of the arrow 37 is accommodated by the upper support assembly 34, while the lower support assembly 32 supports the weight of the rearmost portion of the exhaust pipe 24, as well as the exhaust pipe elbow 26, muffler 28, and stack 30.

The lower support assembly 32 includes a generally horizontally-extending bracket or support member 38, which may be an aluminum casting, and which has a base 40 extending generally vertically, aligned with a vertical surface of the frame member 22 and securely attached to the frame member 22 by fasteners such as mounting bolts 42 received in holes 44 defined in the base 40. Extending from the base 40 and laterally away from the frame member 22 is a support arm 46 having an outer end 48 that defines a mounting hole 50. A vibration isolator mount 52 is held in the mounting hole 50, and a support bracket 54, which may be of formed sheet metal welded to the exhaust pipe elbow 26, rests atop the vibration isolator 52. A fastener such as a bolt 56 extends through a hole 58 defined in a horizontal bottom portion 60 of the support bracket 54, fastening it to the outer end 48 so that the rearward portion of the exhaust pipe 24, the exhaust pipe elbow 26, the muffler 28, and the stack 30 are all held above the vibration isolator 52, extending upward and supported by the outer end 48 of the lower support member 38, with the bolt 56 located substantially centrally beneath the muffler 28 and the stack 30. The bolt 56 may be welded into place in the bracket 54 before it is welded to the elbow 26, or the bracket may include a large enough opening (not shown) to permit the bolt 56 to be inserted later.

The muffler 28 is typically manufactured separately from the exhaust pipe elbow 26, and an inlet pipe in the lower end of the muffler 28 is mated with an upper end of the exhaust pipe elbow 26. The muffler 28 is securely and rigidly attached to the exhaust pipe elbow 26 by a clamp 62.

A preferred structure of the lower support member 38 is shown in FIGS. 5, 6, and 7, where it may be seen clearly that the arm 46 extends laterally, and is arcuately curved and tapered, with a generally "I" cross sectional shape, and is smaller at the outer end 48. The outer end 48 is slightly higher than the top of the base 40, to provide clearance 64 beneath the exhaust pipe 24 and above the frame member 22, as may be seen in FIGS. 1, 2, and 4. The arm 46 may have a length 66 of 464 mm to the center of the mounting hole 50, for example, to support the exhaust pipe elbow 26 where the muffler 28 will be in a desired position with respect to the back 36 of the cab 20, although the length 66 could vary in different trucks.

Referring also to FIGS. 8 and 9, the vibration isolator 52 includes a tubular "biscuit" or body 70 of a compressible, tough elastomeric material such as a durable yet flexible rubber with a durometer hardness of between 50 and 70, for example. The body 70 includes a circular radial flange portion 72 above a cylindrical lower portion 74 of a smaller diameter, shown in a relaxed state in FIG. 8. Within a central bore extending through the body 70 is an internal support tube 76 of metal having a length 78, which is less than the overall length 80 of the body 70 in its relaxed condition.

With the support bracket 54 of the exhaust pipe elbow 26 resting atop the flange 72 and the lower portion 74 of the body 70 extending through the hole 50 defined in the outer end 48 of the support arm 46, a threaded nut 84 is tightened on the bolt 56 against a washer 82, so that the elastomeric body 70 is compressed longitudinally to the length 78 of the tube 76. This causes the elastomeric body 70 also to expand radially, both above and beneath the hole 50 through the outer end 48, creating a radial bulge in the lower portion 74 between the washer 82 and the underside of the outer end 48, beneath the hole 50. Thus deformed by compression, the elastomeric body 70 of the vibration isolator 52 provides resilient isolation of the exhaust pipe elbow 26 from the outer end 48 and allows a small degree of tilting, yet restrains the exhaust pipe elbow 26 against significant movement upward, downward, or in any horizontal direction with respect to the outer end 48. The weight of the exhaust pipe elbow 26, muffler 28, and stack 30 is thus supported atop the outer end 48, yet the muffler 28 and stack 30 are substantially isolated from the frame member 22. Moreover, as is shown in FIGS. 1–4, the bracket 54 is aligned with a central longitudinal axis 55 of the muffler 28 and the stack 30. In order to effect this beneficial alignment, bracket 54 is shaped to conform with a partially downwardly facing surface 57 of the exhaust pipe elbow 26.

Figure 10:
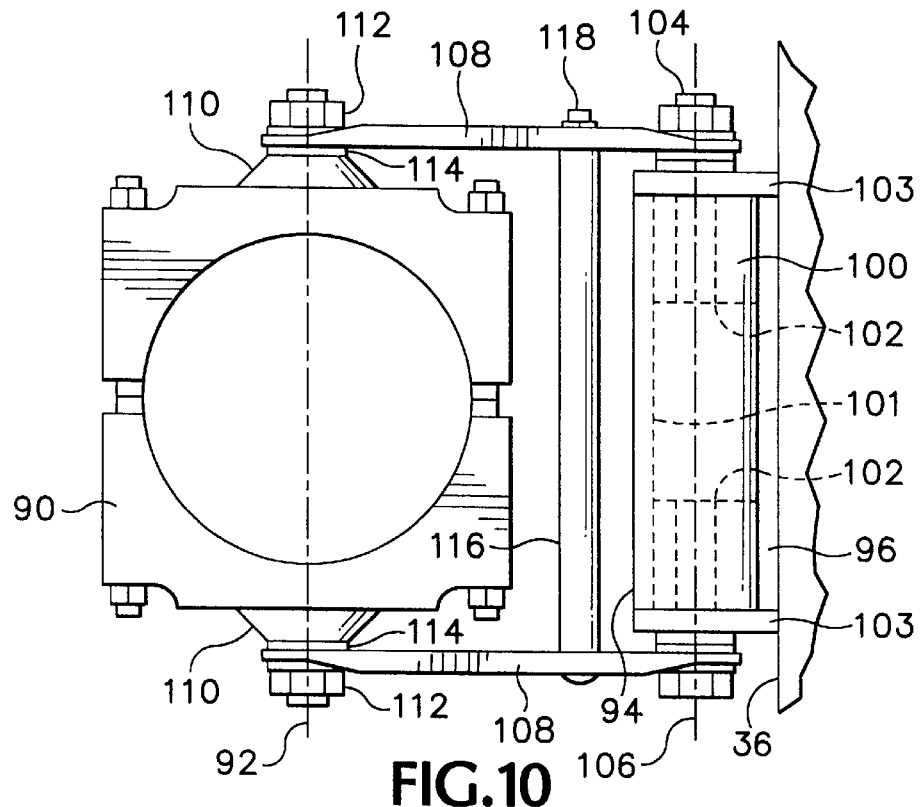
FIG. 10 is a top plan view of the upper support assembly attaching the stack to the cab.
Figure 11:
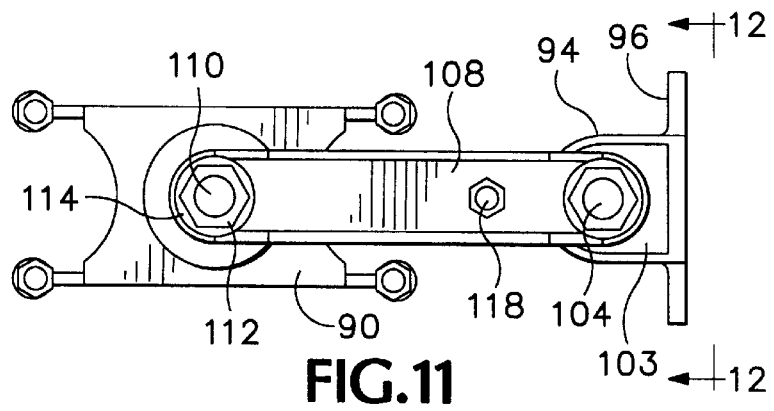
FIG. 11 is a side elevational view of the assembly shown in FIG. 10.
Figure 12:
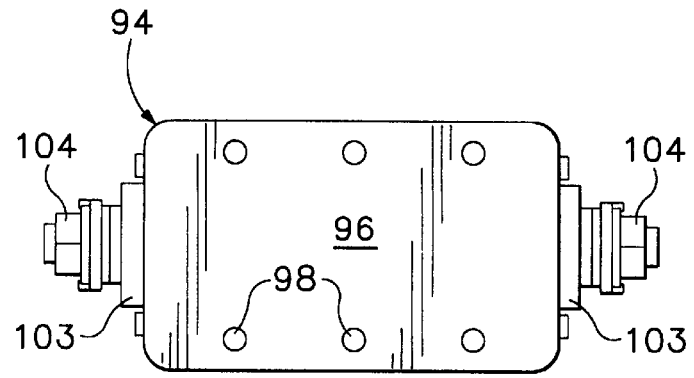
FIG. 12 is a front view of the upper exhaust system attachment assembly shown in FIGS. 10 and 11 taken along line 12—12 of FIG. 11.

The upper support assembly 34, in a preferred embodiment of the invention, includes a clamp 90, best shown in FIGS. 10 and 11, which defines an exhaust stack support opening 91 and securely grips the muffler outlet tube near its connection with the stack 30 a small distance above the top of the body of the muffler 28. The clamp 90 may also serve to attach the stack 30 to the outlet of the muffler 28, but its primary purpose is to establish a rear horizontal pivot axis 92 extending parallel with the back surface 36 of the cab 20, that is, extending generally perpendicular to the length of the truck.

A mounting member 94 includes a flat base 96 defining fastener holes 98 receiving fasteners such as suitable screws to attach the mounting member 94 securely to the back 36 of the cab 20. A tubular body 100 defining a "D" shaped interior cavity 101 is formed integrally with the base 96.

At each end of the body 100, a plug 102 of rubber or another elastomeric material extends a distance into the D-shaped cavity of the body 100, leaving a space within the cavity between the plugs 102. A bushing 103 of a self-lubricating plastic such as Nylon is located at each end of the body 100. Each of the plugs 102 defines a bore through which a fastener such as a bolt and nut combination 104 extends laterally through the bushings 103 and the plugs 102 define a front horizontal pivot axis 106, while the plugs 102 provide a cushioned, vibration-isolating interconnection between the bolt 104 and the mounting 94.

A pair of links 108, which may be of formed sheet steel, extend between the bolt 104 and a pair of trunnions 110, each located on and a part of a respective side of the clamp 90. The trunnions 110 thus define the rear horizontal pivot axis 92. Preferably, the trunnions have threaded end portions to which a rearward end of each link 108 is attached, as by a respective self-locking nut 112 or other suitable fastener, preferably with self-lubricating bushings and washers 114 between each link 108 and the respective trunnion 110, to allow the links 108 to rotate easily about the trunnions 110 in response to relative movement between the cab 20 and the frame 22. Preferably, a crossbar 116, which may be a small diameter tube held in place by a fastener such as a bolt and nut combination 118), extends between the links 108 to establish their positions parallel with each other.

With the bottom of the upright portions of the exhaust system supported and attached firmly to the frame by the lower support assembly 32, the upper support assembly 34 keeps the stack 30 and muffler 28 aligned vertically above the exhaust pipe elbow 26, both laterally and longitudinally with respect to the truck, yet permits the cab 20 to move as required relative to the frame of the truck. Sufficient flexibility is available in the exhaust pipe 24 and in the attachment of the exhaust pipe elbow 26 to the lower support assembly 32 to allow for a slight amount of forward movement resulting from inclination of the links 108 as they pivot.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A mounting assembly for a part of an exhaust system including an exhaust pipe elbow having a partially downwardly facing surface and an exhaust stack, for a motor vehicle having a frame and a cab, said mounting assembly comprising:
   (a) a lower support member having a base configured to be fastened to a member of said frame and an arm extending generally horizontally and having an outer end;
   (b) a vibration isolator mount supported by said outer end of said lower support member and arranged to provide resilient upward support to a partially downwardly facing surface; and
   (c) an upper support member including:
      (i) a clamp defining an exhaust stack support opening and configured to surround and support said exhaust stack and including a pair of trunnions defining a rear horizontal pivot axis, said axis passing through said exhaust stack support opening;
      (ii) a mounting, defining a front horizontal pivot axis; and
      (iii) a link having a front end connected with said mounting and movable with respect thereto about said front horizontal pivot axis and a rear end connected with one of said trunnions and movable with respect to said one of said trunnions about said rear horizontal pivot axis.

2. The mounting assembly of claim 1 wherein said link and said mounting are interconnected through a resilient vibration-cushioning member.

3. A mounting assembly for a part of an exhaust system for a motor vehicle having a frame and a cab, comprising:
   (a) a lower support member having a base configured to be fastened to a member of said frame and an arm extending generally horizontally and having an outer end;
   (b) a vibration isolator mount attached to said outer end of said lower support member and arranged to support a load exerted downward on said outer end;
   (c) an upper support member including:
      (i) a pair of trunnions defining a rear horizontal pivot axis;
      (ii) a mounting, defining a front horizontal pivot axis;
      (iii) a pair of links spaced laterally apart from each other along said horizontal pivot axes each said link having a front end connected with said mounting and movable with respect thereto about said front horizontal pivot axis and a rear end connected with one of said trunnions and movable with respect to said one of said trunnions about said rear horizontal pivot axis; and
      (iv) a cross member attached to both of said links, interconnecting them with each other.

4. A mounting assembly for a part of an exhaust system for a motor vehicle having a frame and a cab, comprising:
   (a) a lower support member having an arm in the form of a tapered arcuate I beam, extending generally horizontally and having an outer end and a base shaped to fit against an upright surface of a member of said frame, defining a plurality of mounting holes, and adapted to be fastened to a member of said frame;
   (b) a vibration isolator mount attached to said outer end of said lower support member and arranged to support a load exerted downward on said outer end; and
   (c) an upper support member including:
      (i) a pair of trunnions defining a rear horizontal pivot axis;
      (ii) a mounting, defining a front horizontal pivot axis; and
      (iii) a link having a front end connected with said mounting and movable with respect thereto about said front horizontal pivot axis and a rear end connected with one of said trunnions and movable with respect to said one of said trunnions about said rear horizontal pivot axis.

5. In combination with a part of an exhaust system including an exhaust pipe elbow having a partially downwardly facing surface, a vertically oriented generally cylindrical muffler having a central longitudinal axis, and an exhaust stack, a muffler mounting system for a motor vehicle including a frame and a cab, said mounting system comprising:
   (a) a lower support member, having a base configured to be fastened to a member of said frame and an arm extending generally horizontally and having an outer end defining a mounting hole;
   (b) a vibration isolator mounted in said mounting hole and arranged to provide resilient upwardly support for a load imposed downwardly on said outer end;
   (c) a bracket supported by said vibration isolator and providing upward support for said partially downwardly facing surface of said exhaust pipe elbow; and
   (d) an upper support member including:
      (i) a clamp defining a rear horizontal pivot axis and engaging said stack above said muffler;
      (ii) a mounting configured to be attached to said cab and defining a front horizontal pivot axis; and
      (iii) a link having a front end connected with said mounting and movable with respect thereto about said front horizontal pivot axis and a rear end connected with said clamp and movable with respect to said clamp about said rear horizontal pivot axis.

6. The mounting system of claim 5 wherein said link and said mounting are interconnected through a resilient vibration-cushioning member.

7. The mounting system of claim 5 wherein said bracket is aligned with said central longitudinal axis of said muffler.

8. In combination with a part of an exhaust system including an exhaust pipe elbow, a vertically oriented generally cylindrical muffler, and an exhaust stack, a muffler mounting system for a motor vehicle including a frame and a cab, said mounting system comprising:

(a) a lower support member, having a base configured to be fastened to a member of said frame and an arm extending generally horizontally and having an outer end defining a mounting hole;

(b) a vibration isolator mounted in said mounting hole and arranged to support a load imposed downwardly on said outer end;

(c) a bracket fixedly attached to said exhaust pipe elbow and interconnected with said arm through said vibration isolator; and (d) an upper support member including:
 (i) a clamp defining a rear horizontal pivot axis and engaging said stack above said muffler;
 (ii) a mounting configured to be attached to said cab and defining a front horizontal pivot axis;
 (iii) a pair of links spaced laterally apart from each other along said horizontal pivot axes, each said link having a front end connected with said mounting and movable with respect thereto about said front horizontal pivot axis and a rear end connected with said clamp and movable with respect to said clamp about said rear horizontal pivot axis; and
 (iv) a cross member attached to both of said links, interconnecting them with each other.

9. In combination with a part of an exhaust system including an exhaust pipe elbow, a vertically oriented generally cylindrical muffler, and an exhaust stack, a muffler mounting system for a motor vehicle including a frame and a cab, said mounting system comprising:

(a) a lower support member, having an arm in the form of a tapered arcuate I beam, extending generally horizontally and having an outer end defining a mounting hole, and having a base shaped to fit against an upright surface of said frame member, defining a plurality of mounting holes, and configured to be fastened to a member of said frame;

(b) a vibration isolator mounted in said mounting hole and arranged to support a load imposed downwardly on said outer end;

(c) a bracket fixedly attached to said exhaust pipe elbow and interconnected with said arm through said vibration isolator; and (d) an upper support member including:
 (i) a clamp defining a rear horizontal pivot axis and engaging said stack above said muffler:
 (ii) a mounting configured to be attached to said cab and defining a front horizontal pivot axis; and
 (iii) a link having a front end connected with said mounting and movable with respect thereto about said front horizontal pivot axis and a rear end connected with said clamp and movable with respect to said clamp about said rear horizontal pivot axis.

10. An engine exhaust system for a motor vehicle having a frame and a cab, comprising:

(a) an exhaust pipe elbow having a partially downwardly facing surface;

(b) a lower support member configured to be fastened to said frame and having an outer end spaced apart from said frame and located beneath said elbow;

(c) a vibration isolator mount supported by said outer end and providing resilient upward support for said Partially downwardly facing surface of said elbow;

(d) a muffler extending upward above said elbow and supported thereby;

(e) an exhaust outlet conduit extending upwardly above said muffler and interconnected therewith;

(f) a clamp attached to said exhaust outlet conduit;

(g) a mounting configured to be fastened to said cab; and (h) at least one link interconnecting said clamp with said mounting, said link being free to pivot about respective axes defined by said clamp and said mounting to accommodate vertical movement of said cab with respect to said frame yet support said muffler and said exhaust outlet conduit in a generally upright orientation above said outer end of said support arm.

11. The exhaust system of claim 10 wherein said link and said mounting are interconnected through a resilient vibration-cushioning member.

12. The mounting system of claim 10 wherein said muffler has a central longitudinal axis and said vibration isolator mount is aligned with said central longitudinal axis of said muffler.

* * * * *